United States Patent [19]

Bökamp et al.

[11] Patent Number: 4,775,198

[45] Date of Patent: Oct. 4, 1988

[54] ARTICULATED LINK FOR THE CONNECTION OF TWO ENDS OF THE TRACK OF A TRACKED VEHICLE

[75] Inventors: Theobald Bökamp, Hagen; Franz-Joachim Helfrich, Bochum, both of Fed. Rep. of Germany

[73] Assignee: Intertractor Viehmann GmbH & Co., Gevelsberg, Fed. Rep. of Germany

[21] Appl. No.: 33,103

[22] PCT Filed: Jul. 16, 1986

[86] PCT No.: PCT/DE86/00290

§ 371 Date: Mar. 3, 1987

§ 102(e) Date: Mar. 3, 1987

[87] PCT Pub. No.: WO87/00496

PCT Pub. Date: Jan. 29, 1987

[30] Foreign Application Priority Data

Jul. 19, 1985 [DE] Fed. Rep. of Germany ....... 3525748

[51] Int. Cl.⁴ ............................................. B62D 55/20
[52] U.S. Cl. ..................................... 305/32 R; 305/39; 305/54
[58] Field of Search .......................... 305/54, 58 R, 39

[56] References Cited

U.S. PATENT DOCUMENTS 1,980,126 11/1934 Williams ................................ 305/39
3,020,096 2/1962 Strnad ................................ 305/58 R
3,096,661 7/1963 Reinsma et al. .................... 305/58 R
3,853,360 12/1974 Khuntia ............................. 305/58 R
4,361,364 11/1982 Brunn ............................... 305/54 X

FOREIGN PATENT DOCUMENTS 2909536 9/1979 Fed. Rep. of Germany .... 305/58 R
3337627 4/1985 Fed. Rep. of Germany .

Primary Examiner—James B. Marbert
Attorney, Agent, or Firm—Herbert Dubno

[57] ABSTRACT

An articulated element of a track comprising two parallel faces consisting of two superimposed parts with holes for articulation bolts. The contact sides of the articulation parts have teeth which mesh with one another and move parallel to the pivoting plane. To lengthen the articulation element, the teeth move transversely and are undercut in such a way that under the effect of a tractional force they bring together the parts of the faces of the articulation elements. To facilitate the manufacture of this articulation element and to reduce its cost, the flanks (9,10) of the teeth (5) and the toothspaces (1) are straight over the whole of their length and end freely on their longitudinal side (7 and 8). The first flanks (9) of the teeth 51 and of the toothspaces (6), which are subjected to tensile forces during rotation of the track are set at right angles to the longitudinal direction of the track articulation, whereas the other flanks (10) of the teeth (5) and toothspaces (6) which are not subjected to tensile forces, are arranged at an acute angle in relation to one another in the longitudinal direction.

5 Claims, 3 Drawing Sheets

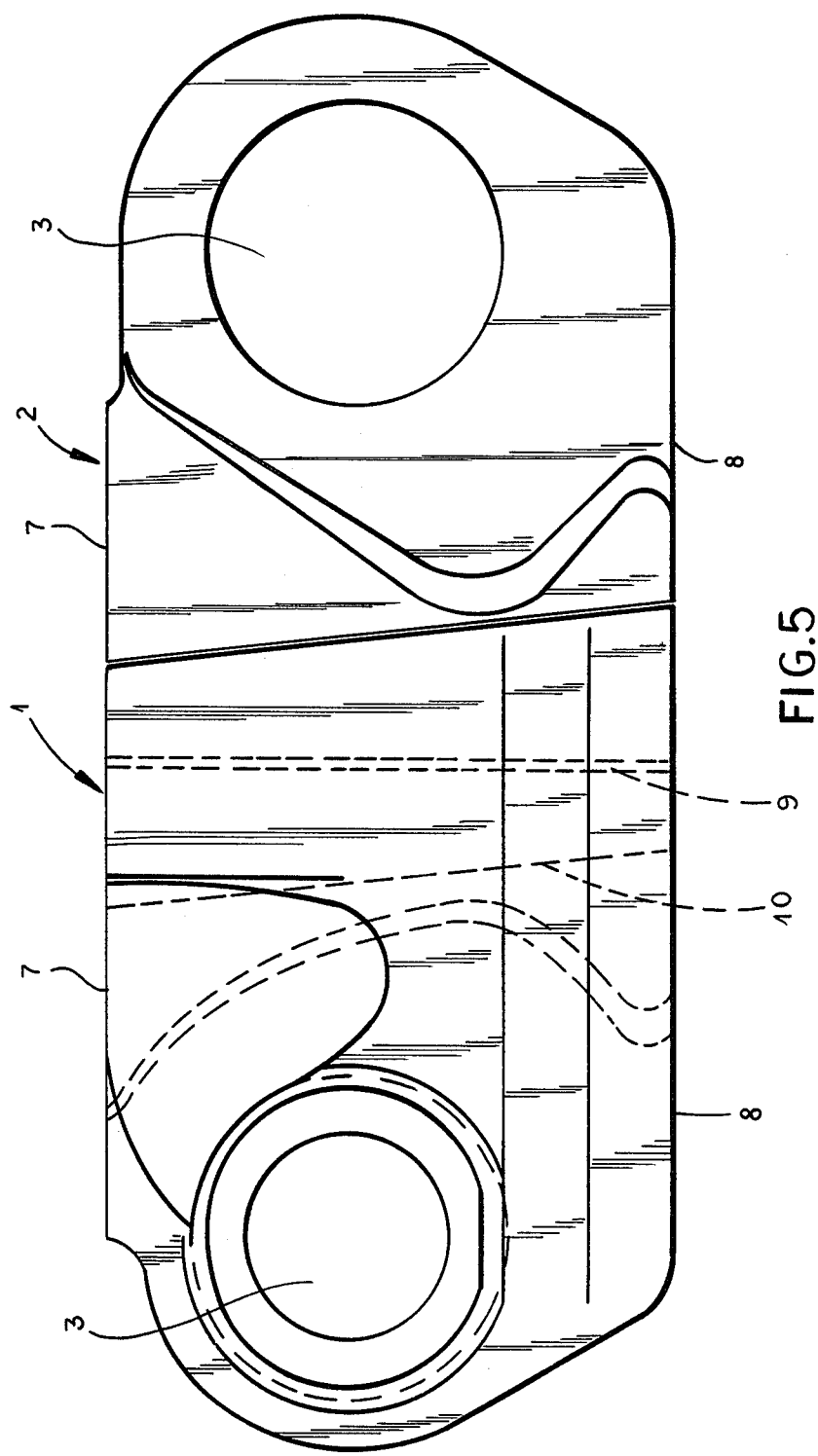

ARTICULATED LINK FOR THE CONNECTION OF TWO ENDS OF THE TRACK OF A TRACKED VEHICLE

CROSS REFERENCE TO RELATED APPLICATIONS

This application is a national phase application corresponding to PCT/DE 86/00290 filed July 16, 1986 and based, in turn, on German national application No. P35 25 748.2 of July 19, 1985 under the International Convention.

1. Field of the Invention

The invention relates to an articulated link for the connection of the ends of the track of a tracked vehicle, whereby two link faces arranged parallel to each other are provided, each link face consisting of two mutually overlapping link-face parts, each having a bore for receiving an articulation bolt, the corresponding contact sides of the link-face parts being arranged parallel to the pivoting plane of the latter, at mutually corresponding contact sides of the link-face parts meshing teeth are provided, as well as a bottom plate bridging both link face parts, which is detachably mounted via throughgoing bolts to the link faces, the toothings in the direction of their longitudinal extent are transverse to the longitudinal extent of the track link, and, in addition, are undercut in such a manner that under the effect of a traction force, they subject the mutually corresponding link face parts to transversal forces directed towards each other.

2. Background of the Invention

An articulated link of this kind is known from German open application No. 30 13 026.

Therein, the teeth and tooth gaps run in concentric circles, whose centers are located on an articulation bolt axis, so that the track can be easily connected. The manufacturing of such teeth is however relatively complicated and expensive.

Even more complicated and expensive is the manufacturing when, according to German Utility Model No. 82 25 641.1, the flanks of the tooth gaps of one of the link faces are constructed in such a manner as to come closer to each other on the side of the tooth gap facing away from the bottom plate, whereby the interval between the flanks in this area is slightly smaller than the thickness of the tooth of the link face engaging in the gap, in order to ensure a certain prelocking of the meshing teeth at the closing of the track, before the bottom plate is mounted.

OBJECT OF THE INVENTION

It is now the object of the invention to provide an improved articulated link while maintaining the advantages already reached according to the state of the art and enabling simpler and cheaper techniques for its manufacture.

SUMMARY OF THE INVENTION

The solution to this problem is characterized in that the flanks of the teeth and tooth gaps are straight over their entire length in the direction of their longitudinal extent and that, on the longitudinal side of the track link facing the bottom plate as well as on the longitudinal side facing away from the bottom plate, they are configured to end freely, and that further the first flanks of the teeth and tooth gaps subject to traction forces are perpendicularly arranged with respect to the longitudinal extent of the track link, while the others, second teeth and tooth gaps not subjected to the traction forces, are arranged at acute angles with respect to the first flanks in the direction of their longitudinal extent. The first and the second flanks of the teeth and tooth gaps preferably include an acute angle of 6°.

The flanks, straight over their entire length, and freely ending on both longitudinal sides of the link face parts are easier to manufacture and considerably cheaper than curved flanks.

The link face parts can still be joined relatively simply and also a certain prelocking of the link face parts joined in the correct position is reached, prior to the mounting of the bottom plate.

BRIEF DESCRIPTION OF THE DRAWING

An embodiment of the invention is represented in the drawing and is described more in detail below. In the drawing:

FIG. 5 is a front view of the interconnected links.

Figure 1:
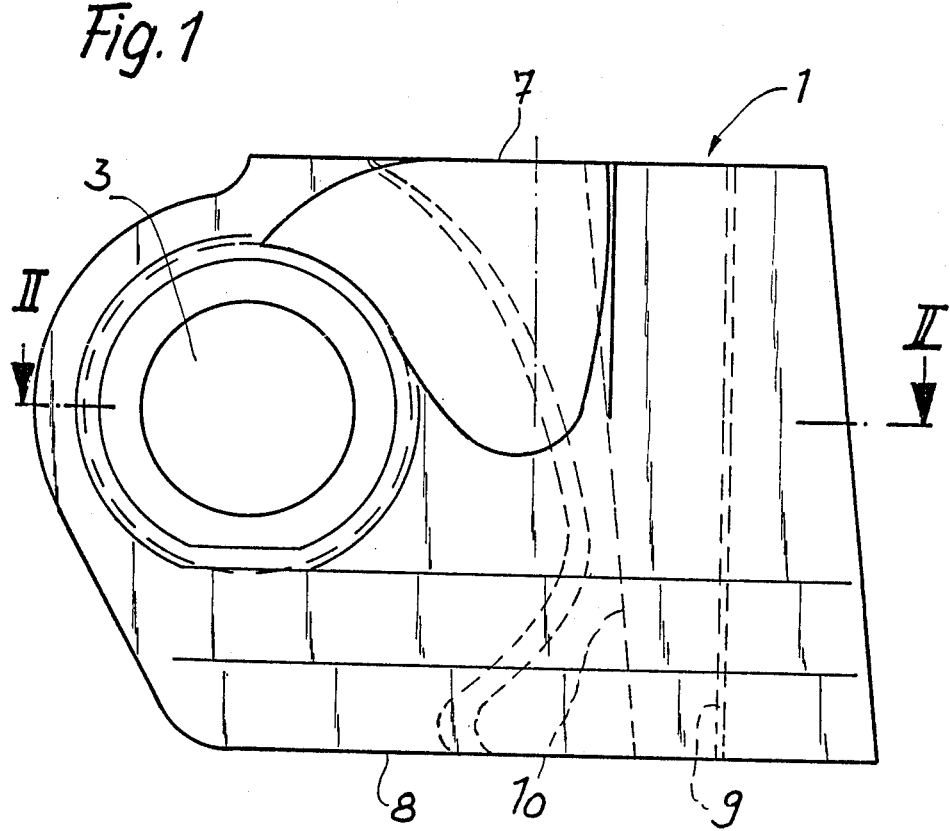
FIG. 1 is a link face part in a frontal view.
Figure 2:
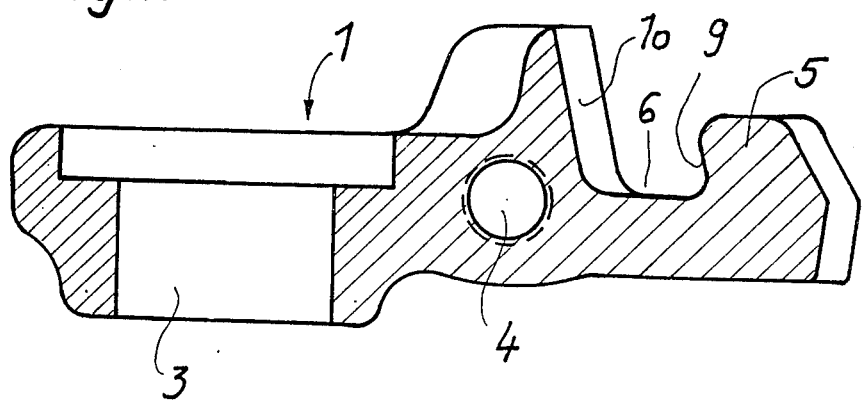
FIG. 2 is a section along the line II—II of FIG. 1.
Figure 3:
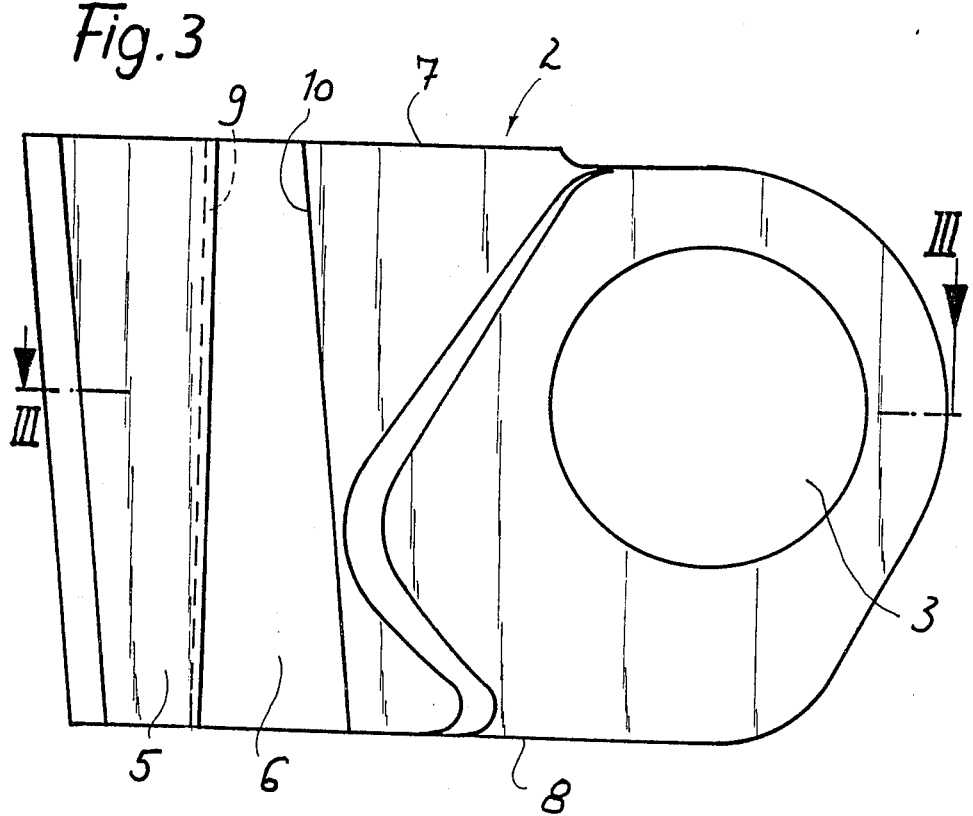
FIG. 3 is the second link face part in a frontal view.
Figure 4:
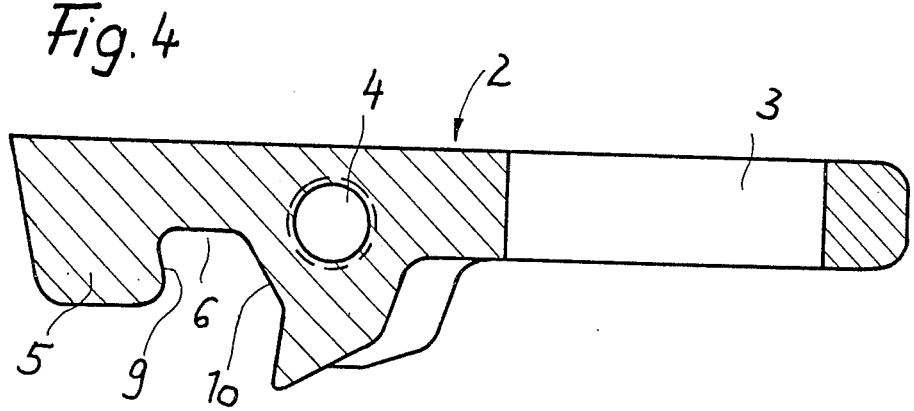
FIG. 4 is a section along line IV—IV of FIG. 3.

The articulated link for the connection of the two ends of a vehicle track consists of two mutually parallel link faces. Each of these two link faces comprise two link face parts 1 + 2, each having a bore 3 for receiving a non-illustrated track bolt, respectively track bushing. The track bolt and the track bushing are press-fitted, so that they can be disengaged only by applying considerable forces.

The two link face parts 1 + 2, arranged mutually overlapping when in their operational position, have meshing toothings on their mutually corresponding contact sides, running parallelly to the pivoting plane of the link face parts.

Besides, in the narrow longitudinal sides of the link face parts, threaded bores 4 for receiving of non-illustrated bolts are provided, which serve for fastening a bottom plate, also not shown in the drawing, which bridges both link faces of an articulated link.

In the direction of their longitudinal extent the toothings are arranged transversely to the longitudinal extent of the link face parts 1 + 2.

In addition, the toothing are undercut in such a manner that they urge the link face parts 1 + 2 towards each other, when under the influence of traction force.

Both link face parts 1 + 2 have each one tooth 5, arranged at the free end of each of the link face parts, and an adjacent tooth gap 6. The tooth gaps 6 are profiled so that the tooth 5 of each one link face part engages form-lockingly in the tooth gap of the respective other link face part.

Besides, the flanks of the teeth 5 and the tooth gaps 6 are each of them straight over their entire length, ending freely at the narrow longitudinal sides 7 + 8. Further, the first flanks 9 which are subjected to traction force during the running of the track, are perpendicular with respect to the longitudinal sides 7 + 8, and the flanks 10, which are not subjected to the traction force, are arranged with respect to the respective neighboring flank 9 at an acute angle of preferably 6°.

The length of a tooth 5, respectively of a tooth gap 6, is approximately equal to 6 times the smallest clear width of a tooth gap 6, and the smallest clear width of a tooth gap 6 is approximately equal to its depth.

Furthermore, the flanks 9 are arranged at an angle of approximately 12° with respect to the pivoting plane of the link face parts 1 and 2. In the link face part 1, the free frontal side and the flank of the tooth gap 6 of the link face part 2, cooperating with the mentioned frontal side, is profiled corresponding to the mentioned frontal parts in such obtuse angles, that the frontal side segment facing away from the contact sides and the thereto opposite undercut tooth gap flank, due to their intermeshing toothing create a form-locking connection, which precludes a separation of the two link face parts 1 and 2.

In addition, the frontal side segment facing the contact sides and the tooth flank segment adjacent thereto, are arranged at a 30° angle with respect to the pivoting plane.

We claim:

1. A link for connection of two ends of a track of a tracked vehicle, comprising:
   two generally planar elongated link members having opposite parallel longitudinal sides bridged by a generally curved end at one extremity of each of said members, each of said members comprising:
   a respective bore formed at said one extremity of the respective member for articulating the link members to opposite ends of the track,
   a respective linear tooth at an opposite extremity of the respective member, extending all the way across the width of the respective member between said longitudinal sides thereof and tapering in a direction from one of said longitudinal sides of the respective member to the other longitudinal side, so that a frictional flank facing away from said other extremity is straight and perpendicular to said longitudinal sides over the entire length of said frictional flank, said respective linear tooth having a second flank facing towards said other extremity and including an acute angle with said frictional flank,
   a linear groove adjoining the respective tooth and extending linearly all across the width of the respective member between the longitudinal edges thereof and tapering complementarily in a direction opposite to the direction of taper of said tooth so that each of said grooves receives the tooth of the other member in a locked position of said members, said groove having a third flank including an acute angle with respect to the respective frictional flank and being defined between said frictional flank and said third flank, said frictional flank overhanging the floor of the respective groove; and
   means including a plate extending across the link members along one of said longitudinal sides for fastening said members in said locked position.

2. The link defined in claim 1 wherein said second and third flanks each include angles of about 6° with said frictional flank.

3. The link defined in claim 1 wherein said groove tapers from a greatest width at one end to a smallest width at an opposite end of the groove and the ratio of the length of the groove to the smallest width is substantially 6:1.

4. The link defined in claim 3 wherein said groove has a depth equal substantially to said smallest width.

5. The link defined in claim 4 wherein said frictional flank is inclined at an angle of substantially 12° to a perpendicular to said floor of said groove.

* * * * *